(12) United States Patent
Chau et al.

(10) Patent No.: US 12,651,378 B2
(45) Date of Patent: Jun. 9, 2026

(54) DEEP LEARNING SYSTEMS, DEVICES, AND METHODS FOR PREDICTING HIGH-DYNAMIC RANGE ENVIRONMENT PANORAMAS

(71) Applicant: L'Oreal, Paris (FR)

(72) Inventors: Kin Ching Lydia Chau, Toronto (CA); Panagiotis-Alexandros Bokaris, Paris (FR); Ruowei Jiang, Mississauga (CA); Zhi Yu, Toronto (CA); Tao Li, Sceaux (FR)

(73) Assignee: L'Oreal, Paris (FR)

( * ) Notice: Subject to any disclaimer, the term of this patent is extended or adjusted under 35 U.S.C. 154(b) by 371 days.

(21) Appl. No.: 18/390,542

(22) Filed: Dec. 20, 2023

(65) Prior Publication Data

US 2025/0209670 A1     Jun. 26, 2025

(51) Int. Cl.
*G06T 7/90*       (2017.01)
*G06T 5/90*       (2024.01)
*G06T 11/00*      (2006.01)

(52) U.S. Cl.
CPC ................. *G06T 7/90* (2017.01); *G06T 5/90* (2024.01); *G06T 11/00* (2013.01);
(Continued)

(58) Field of Classification Search
CPC ... G06T 7/90; G06T 5/90; G06T 11/00; G06T 2207/10016; G06T 2207/10024;
(Continued)

(56) References Cited

U.S. PATENT DOCUMENTS

2018/0359416 A1* 12/2018 Hold-Geoffroy .... H04N 23/667
2019/0164261 A1*  5/2019 Sunkavalli ................ G06T 5/90
(Continued)

FOREIGN PATENT DOCUMENTS

WO    WO-2024089396 A1 *  5/2024   ........... H04N 13/239

OTHER PUBLICATIONS

International Search Report and Written Opinion of the International Searching Authority mailed Mar. 31, 2025, issued in corresponding International Application No. PCT/EP2024/085807, filed Dec. 11, 2024, 12 pages.
(Continued)

*Primary Examiner* — Jose L Couso
(74) *Attorney, Agent, or Firm* — Christensen O'Connor Johnson Kindness PLLC

(57)       ABSTRACT

Aspects of lighting estimation, and models therefor are provided including aspects to train such models. There is provided a lighting estimation model pre-trained using synthetic data to alleviate the costs and difficulty in obtaining real portrait image and HDR environment map paired datasets. To improve model performance, the model is training utilizing a discriminator configured to predict one or more average color values of a defined percentage of highest intensity pixels of a predicted environment map and to determine a color loss associated with the predicted environment map and the one or more average color values. The trained model can be used for a wide range of downstream tasks, including being used to generate hair renderings with realistic lighting effects for virtual try on experiences.

20 Claims, 5 Drawing Sheets

(52) U.S. Cl.
CPC ............... *G06T 2207/10016* (2013.01); *G06T 2207/10024* (2013.01); *G06T 2207/20081* (2013.01); *G06T 2207/20208* (2013.01); *G06T 2207/30201* (2013.01)

(58) Field of Classification Search
CPC . G06T 2207/20081; G06T 2207/20208; G06T 2207/30201; G06T 2207/20084; G06T 5/60; G06T 15/506; G06T 7/194; G06T 15/60; G06T 2215/12; G06T 15/80; G06T 3/4046; G06T 9/002; G06T 2207/20076; H04N 19/167; H04N 5/2624; H04N 23/611; H04N 23/71; H04N 5/202; H04N 5/57; H04N 9/73; H04N 9/77; H04N 9/78; H04N 13/133; H04N 21/4854; H04N 23/70; H04N 23/74; H04N 23/82; G06V 10/60; G06V 10/454; G06V 10/54; G06V 10/7764; G06V 10/774; G06V 10/82; G06V 10/84; G06V 20/41; G06V 30/18057; G06V 20/698; G06V 30/19173; G06V 30/194; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06F 18/213; G06F 18/214; G06F 18/22; G06F 18/241; G06F 18/24; G06F 18/2411; G06F 18/2415; G06F 18/253; G06F 30/27; Y10S 128/925
See application file for complete search history.

(56) References Cited

U.S. PATENT DOCUMENTS

| | | | | | |
|---|---|---|---|---|---|
| 2020/0151509 | A1* | 5/2020 | Sunkavalli | ............. | G06V 10/82 |
| 2020/0186714 | A1* | 6/2020 | Hold-Geoffroy | .... | G06V 10/764 |
| 2021/0027526 | A1* | 1/2021 | Dong | ...................... | G06T 17/20 |
| 2021/0065440 | A1* | 3/2021 | Sunkavalli | ................ | G06T 7/70 |
| 2021/0073955 | A1* | 3/2021 | Zhang | ........................ | G06T 5/92 |
| 2021/0166437 | A1* | 6/2021 | LeGendre | ................. | G06T 7/70 |
| 2021/0406581 | A1* | 12/2021 | LeGendre | ............ | G06V 10/751 |
| 2022/0027659 | A1* | 1/2022 | LeGendre | ............ | H04N 23/741 |
| 2022/0116549 | A1 | 4/2022 | Neofytou et al. | | |
| 2022/0157014 | A1* | 5/2022 | Sevastopolskiy | ...... | G06N 3/084 |
| 2024/0096011 | A1* | 3/2024 | Sevastopolskiy | ....... | G06T 15/10 |
| 2024/0127402 | A1* | 4/2024 | Dastjerdi | .................. | G06T 5/50 |
| 2024/0185504 | A1* | 6/2024 | Shin | ...................... | H04N 19/70 |
| 2024/0187559 | A1* | 6/2024 | Li | ........................... | G06V 10/60 |
| 2024/0212106 | A1* | 6/2024 | LeGendre | ................ | G06T 5/94 |

OTHER PUBLICATIONS

Sztrajman, A., et al., "High-Dynamic-Range Lighting Estimation From Face Portraits", 2020 International Conference on 3D Vision (3DV), IEEE, Nov. 25, 2020, pp. 355-363.

Legendre et al., "Learning Illumincation from Diverse Portraits," Google Research (Aug. 2020), 14 pages.

Legendre et al., "Learning Illumincation ffor Unconstrained Mobile Mixed Reality," Google, Inc., USC Institute for Creative Technologies, (Apr. 2019), 11 pages.

Somanath et al., "HDR Environment Map Estimation for Real-Time Augmented Reality," (Jul. 2021), 16 pages).

Wang et al., "StyleLight: HDR Panorama Generation for Lighting Estimation and Editing," S-Lab, Nanyang Technological University, (Jul. 2022), 22 pages.

Gardner et al., :Deep Parametric Indoor Lighting Estimation, Universite Laval, (Oct. 2019), 9 pages.

Gardner et al., "Learning to Predict Indoor Illumination from a Single Image," Universite Laval, (Nov. 2017), 14 pages.

Garon et al., "Fast Spatially-Varying Indoor Lighting Estimation," Universite Laval, (Jun. 2019), 10 pages.

* cited by examiner

DEEP LEARNING SYSTEMS, DEVICES, AND METHODS FOR PREDICTING HIGH-DYNAMIC RANGE ENVIRONMENT PANORAMAS

FIELD OF INVENTION

The present disclosure relates to computer image processing and artificial intelligence, particularly to systems and methods for lighting estimation and more particularly to predicting high-dynamic-range (HDR) environment panoramas from single low-dynamic-range (LDR) limited field-of-view portrait images.

BACKGROUND

Ambient light color and light direction in a real world scene have significant impact on the content of an image that captures a view of that scene. Scene images can be processed and new images outputted to provide augmented reality experiences including virtual try on (VTO) experiences where one or more effects are applied to an object in the images. For example, processing can apply hair effects, makeup effects, and the like to a head of a person in the image. VTO and other augmented reality experiences are often presented via a consumer-oriented computing device such as a smartphone, tablet, laptop, or desktop where an input image of a scene comprises a single low-dynamic-range (LDR) limited field-of-view (FOV) portrait image such as a portrait "selfie" of a user.

A lighting estimation deep learning model can estimate the lighting scene of an input image, for example, to provide an environment map. In an example, the environment map can inform realistic rendering results in an augmented reality experience. Compiling portrait images with paired lighting data (e.g. an environment map) for training a light estimate model is expensive and time consuming.

It is desired to provide improvements to lighting estimation deep learning models and their training.

SUMMARY

In at least some aspects, it is desirable to have a deep learning computer system and method that predicts HDR environment panorama(s) from LDR limited field-of-view portrait image(s) to estimate lighting conditions and further to generate realistic image data for use in augmented reality experiences.

In at least some aspects, the ability to estimate lighting conditions and predict HDR environment panorama(s) using a deep learning computer system and method utilizing an estimation model trained on a dataset of synthetic images would help overcome the expensive and time-consuming process associated with collecting portrait image and HDR environment map paired data to train lighting estimation models. In at least some aspects, such a model trained on a dataset of synthetic images would help address the issue of model biases towards certain demographic groups, which may result from the typical necessity of training such systems on a small real dataset due to time or cost constraints.

According to an aspect of the present invention, there is provided a computer system and method utilizing a deep learning lighting estimation model(s), including aspects to train such model(s). Further in accordance with an embodiment, there is provided a synthetic dataset utilized for training a lighting estimation model(s) to alleviate the costs and difficulty in obtaining real portrait image and HDR environment map paired datasets. In accordance with an embodiment, a generated synthetic dataset is provided in which a large synthetic dataset of subjects and environments are sampled to ensure the dataset covers a diversity of lighting conditions and subject demographics, including diverse gender, ethnicity, and age group subjects, to ensure the lighting estimation models are not biased towards certain demographic groups.

To further improve model performance, in accordance with an embodiment, there is provided an evaluation pipeline to assess the model's ability to infer lighting conditions, in the form of an environment map, from real portrait images. In accordance with an embodiment, a video evaluation pipeline is provided to qualitatively measure the model's environment map prediction consistency.

The following statements provide various aspects and features disclosed in the embodiments herein. These and others will be apparent to those of ordinary skill in the art such as computer program product aspects. It is also understood that computing device aspects may have corresponding method aspects and vice versa.

Statement 1: A computing device comprising a processor coupled to a storage device storing instructions executable by the processor to cause the computing device to: predict a predicted environment map for lighting conditions in an input image using a generator of a deep learning model, the predicted environment map encoding one or more light sources and an estimate of light source color in the input image, the deep learning model having been defined through training using a discriminator that predicts one or more average color values of a defined percentage of highest intensity pixels of an environment map, the discriminator defined using a color loss determined from: one or more average color values of a defined percentage of highest intensity pixels of a ground truth environment map; and a prediction by the discriminator for a training time predicted environment map generated by the generator; and generate an output image comprising one or more objects from the input image to which one or more respective effects are applied, wherein a property of each of the respective effects is adapted to the predicted environment map.

Statement 2: The computing device of Statement 1, wherein the training time predicted environment map encodes one or more predicted light sources and an estimate of light source color of one of a plurality of synthetically generated images provided to the generator, the plurality of synthetically generated images having lighting conditions comprising light source direction and light source color.

Statement 3: The computing device of Statement 2, wherein at least one of: the plurality of synthetically generated images comprises a dataset of portrait images containing combinations of subjects and environments sampled to cover a diversity of demographics, light source directions, and light source colors; the plurality of synthetically generated images subjects comprise synthetic faces sampled based on diverse gender, ethnicity, and age; the plurality of synthetically generated images are generated to include instances of neutral facial expressions and extreme facial expressions and at different head poses and orientations; or the plurality of synthetically generated images comprises images with a field-of-view set between 50 and 70 degrees view angle.

Statement 4: The computing device of Statement 1, wherein the deep learning model is defined through training comprising generating one or more bounding boxes to align a center of a head in the input image and perform one or both of rotating or transposing an environment of the input image to align a center of the environment with the center of the head.

Statement 5: The computing device of Statement 1, wherein the defined percentage of the highest intensity pixels of the ground truth environment map is within the range of 5 percent to 10 percent.

Statement 6: The computing device of Statement 5, wherein the intensity of pixels of the ground truth environment map is defined based on a perceptual lightness channel (L*) of CIELAB color space.

Statement 7: The computing device of Statement 1, wherein the generator comprises one or more convolution output layers, and one or more upsampling blocks, each of the upsampling blocks comprising a convolution layer, a ReLu activation layer, and a bilinear upsampling layer.

Statement 8: The computing device of Statement 1, wherein the input image comprises a limited field-of-view low-dynamic-range portrait image and the output image comprises a high-dynamic-range image.

Statement 9: The computing device of Statement 1, wherein the effect applied to the one or more objects from the input image is a virtual-try on effect.

Statement 10: The computing device of Statement 1, wherein the generator is defined through training using a reconstruction loss, the reconstruction loss defined from an L2 loss applied to the training time predicted environment map and the ground truth environment map.

Statement 11: The computing device of Statement 10, wherein the generator is defined through training using a generator loss, the generator loss determined from a weighted sum of the reconstruction loss and the color loss, and wherein the weighted sum is set to 10 to 1.

Statement 12: The computing device of Statement 1, wherein the generator is defined through training using a consistency loss, the consistency loss determined from: a first predicted environment map generated by the generator for lighting conditions of a first consecutive video frame; and the sum of a second predicted environment map generated by the generator for lighting conditions of a second consecutive video frame and a third predicted environment map generated by the generator for lighting conditions of a third consecutive video frame.

Statement 13: The computing device of Statement 1, further comprising a camera device configured to perform one or both of capturing or recording the input image.

Statement 14: A method of configuring a deep learning model that predicts lighting conditions in an input image and generates a predicted environment map for lighting conditions in the input image, the method comprising: defining the deep learning model through training using a discriminator that predicts one or more average color values of a defined percentage of highest intensity pixels of an environment map, the discriminator defined using a color loss determined from: one or more average color values of a defined percentage of highest intensity pixels of a ground truth environment map; and a prediction by the discriminator for a training time predicted environment map generated by a generator of the deep learning model for lighting condition of a training image; and generating the predicted environment map using the generator, the generator having been defined through training using the color loss.

Statement 15: The method of Statement 14, wherein the training image comprises one of a plurality of synthetically generated images provided to the generator, the plurality of synthetically generated images having lighting conditions comprising light source direction and light source color.

Statement 16: The method of Statement 15, wherein at least one of: the plurality of synthetically generated images comprises a dataset of portrait images containing combinations of subjects and environments sampled to cover a diversity of demographics, light source directions, and light source colors; the plurality of synthetically generated images subjects comprise synthetic faces sampled based on diverse gender, ethnicity, and age; the plurality of synthetically generated images are generated to include instances of neutral facial expressions and extreme facial expressions and at different head poses and orientations; or the plurality of synthetically generated images comprises images with a field-of-view set between 50 and 70 degrees view angle.

Statement 17: The method of Statement 14, wherein the generator is defined through training using a reconstruction loss, the reconstruction loss defined from an L2 loss applied to the training time predicted environment map and the ground truth environment map.

Statement 18: The method of Statement 17, wherein the generator is defined through training using a generator loss, the generator loss determined from a weighted sum of the reconstruction loss and the color loss, and wherein the weighted sum is set to 10 to 1.

Statement 19: The method of Statement 14, wherein the generator is defined through training using a consistency loss, the consistency loss determined from: a first predicted environment map generated by the generator for lighting conditions of a first consecutive video frame; and the sum of a second predicted environment map generated by the generator for lighting conditions of a second consecutive video frame and a third predicted environment map generated by the generator for lighting conditions of a third consecutive video frame.

Statement 20: A computing device comprising: a VTO (virtual try-on) rendering engine configured to produce an output image for display, wherein the output image comprises an object from an input image to which a VTO effect is applied, the VTO rendering engine comprising a deep learning model configured through training to provide a predicted environment map for lighting conditions in the input image and wherein the effect is applied to the object as adapted by the predicted environment map, the deep learning model defined through training by: providing a generator; providing a discriminator that predicts one or more average color values of a defined percentage of highest intensity pixels of an environment map, the discriminator defined using a color loss determined from: one or more average color values of a defined percentage of highest intensity pixels of a ground truth environment map; and a prediction by the discriminator for a training time predicted environment map generated by the generator; and wherein the training time predicted environment map encodes one or more predicted light sources and an estimate of light source color of one or more of a plurality of synthetically generated images provided to the generator, the plurality of synthetically generated images having lighting conditions comprising light source direction and light source color; and wherein the generator is defined through training using a reconstruction loss, the reconstruction loss defined from an L2 loss applied to the training time predicted environment map and the ground truth environment map; and one or both of a VTO product recommendation interface or a product purchase interface, wherein the VTO effect is associated with a product to simulate a trying on.

BRIEF DESCRIPTION OF THE DRAWINGS

These and other features of the invention will become more apparent from the following description in which reference is made to the appended drawings wherein.

DETAILED DESCRIPTION

Figure 1:
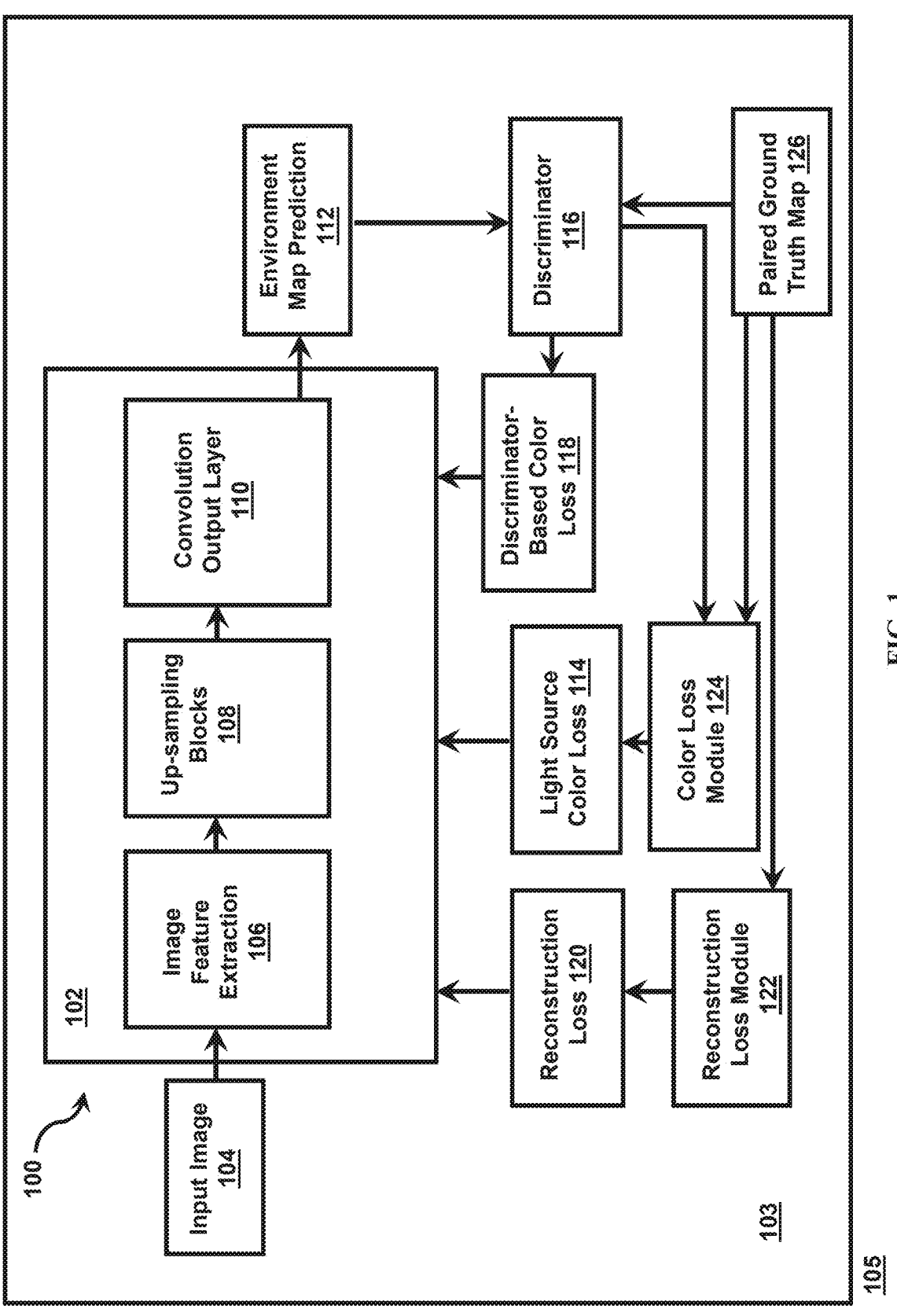
FIG. 1 is a block diagram showing an example deep learning lighting estimation model, in accordance with an embodiment.

Systems, devices, and methods herein seek to improve existing lighting estimation deep learning applications by providing a lighting estimation model trained on a dataset of synthetic images. Generally, in at least some embodiments there is provided systems and methods that utilize an estimation model trained on synthetic datasets to estimate lighting conditions in an input photo.

To make realistic rendering results in augmented reality experiences, research has been conducted to estimate the lighting scene of images through deep learning models. Gardner et al. [9] first introduced an end-to-end deep neural network that directly regresses key lighting locations and intensities from a limited field-of-view photo, without strong assumptions on scene geometry, material properties, or lighting. Previous models used to estimate the lighting scene of images can be classified according to two main categories: regression models that estimate low-dimensional panorama lighting parameters and generative models that generate non-parametric illumination maps or light probes. For example, there are models which regress on more lighting parameters such as light source color [9], angular size of the light in steradians [9] or 5th order spherical harmonic representation of lighting [10]. With the increasing popularity of generative models, there are also image-to-image generative models that directly generate an HDR environment map, such as styleLight [7]. Regression models have less flexibility and loss details in describing the lighting information and require additional post processing steps to convert the lighting parameters to HDR environment map for image-based relighting, and as such, it is desired to have a generative model for lighting estimation.

Previous works have explored ways to infer lighting information in real-time augmented reality applications. LeGender et al. [2] first proposed models that predict low-resolution HDR light probes based on limited field-of-view LDR unconstrained images, and later extended the work to focus on predicting light probes based on limited field-of-view LDR portrait images [5]. These models are small models that can infer in real-time on mobile applications. However, since the light probes have low-resolution and only capture the lighting information behind the camera, it limits the realism when using the light probes to render images. To address this issue, Somanath et al. [6] introduced a model that infers high-resolution HDR panorama maps based on limited field-of-view LDR unconstrained images.

Multiple challenges are present in developing generative models for lighting estimation. For example, collecting portrait image and HDR environment map paired data is an expensive task as it requires the lighting of the face in the portrait images to be consistent with the corresponding environment map. This restricts the ability of collecting a large portrait and light map dataset with diverse environments and subjects. As such, models trained on small real datasets cover only a small variety of subjects and environments, and may result in model biases towards certain demographic groups.

Previously, the Laval Face+Lighting HDR dataset [1] was created by inviting 9 subjects to 25 environments with different lighting conditions, and sequentially photographing the environments at different orientations and exposures, and the subjects. LeGender et al. [2] generated such a dataset by first recording the reflectance field and alpha matte of 70 diverse subjects using a light stage, and collecting HDR environment maps separately, then relighting the subjects using image-based relighting to create portrait image and environment map pairs. Similarly, Sztrajman et al. [3] also generated the dataset by combining relighted scanned faces from the ICT 3d Relightable Facial Expression Database [4] with environment maps from the Laval Face+Lighting HDR dataset [1]. This can increase the variety of environment maps in the dataset but the dataset still only covers a small variety of subjects.

Model Architecture

FIG. 1 shows a block diagram of a computing device in which one or more technologies or methodologies can be implemented, such as, for example, estimating the lighting conditions for synthetic content within an augmented reality environment, mix-reality environment, virtual try-on environment, and the like. In an embodiment, the computing device includes a processor computational circuitry, and one or more deep learning components configured to predicting high-dynamic-range (HDR) environment panoramas from single low-dynamic-range (LDR) limited field-of-view portrait images.

In an embodiment, the computing device is configured to provide an estimation flow 100 in accordance with an embodiment in which an estimation model 102 is configured for receiving an input image 104 as input, and outputs an environment map prediction 112. In a training mode, input image 104 represents a training image associated with a paired ground truth map 126. In an inference time mode, input image 104 represents an inference time image such as a user image for use in an augmented reality experience.

It will be understood that FIG. 1 represents estimation flow 100 as data components and executable components stored within one or more storage devices 103 of a computing device 105, in accordance with an embodiment. The executable components are executable by a processor (not shown) of the computing device. In an embodiment, input image 104 comprises a limited field-of-view LDR portrait image. In a further embodiment, input image 104 comprises a synthetically generated image. In an embodiment, estimation model 102 comprises a generator based on encoder-decoder architecture. In an embodiment, image feature extraction 106 uses MobileNet v2 to extract image features from input image 104. In an embodiment, up-sampling blocks 108 comprises 5 up-sampling blocks, wherein each up-sampling block comprises a convolution layer, a ReLu activation layer, and a bilinear up-sampling layer. In accordance with the embodiment in FIG. 1, estimation model 102 further comprises convolution output layer 110. Estimation model 102 outputs a predicted environment map, generated by a generator, as environment map prediction 112. In an embodiment, environment map prediction 112 is predicted in log scale to convey long-tailed RGB color distribution data of HDR environment maps.

In an embodiment, discriminator 116 comprises 6 convolution layers and each convolution layer is followed by a Leaky ReLu activate layer. In some embodiments, discriminator 116 further comprises a fully-connected output layer (not shown) configured to predict average RGB values. In an embodiment, estimation flow 100 represents a training flow at a training time. Components 102 are retained for inference time use.

Figure 3:
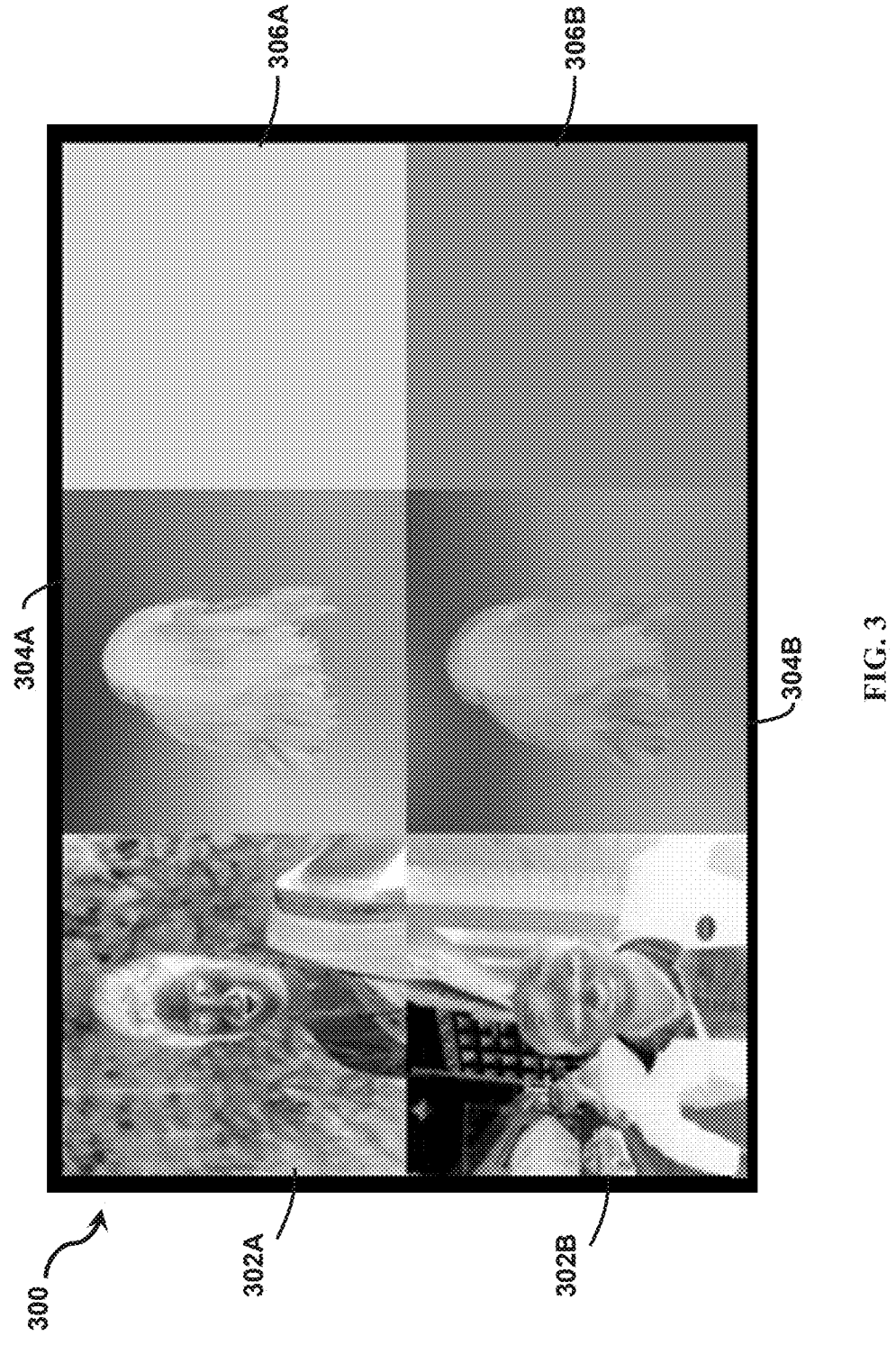
FIG. 3 shows an array of evaluation images in accordance with an embodiment.

The input image 104 may be received from another computing device (not shown) across a communication network (not shown) or at least partially input by a user at a computing device for the estimation model (e.g. a computing device 300 shown at FIG. 3).

Loss Functions

Previous works [7, 8] typically apply pixel-wise loss on top 5-10% highest intensity pixels in an environment map. In accordance with experimental results and the techniques and teaching herein, estimation model training is improved when such loss is instead calculated through a discriminator. As such, in an embodiment, environment map prediction 112 generated by a generator is output from estimation model 102 and passed to discriminator 116 (an executable component). Discriminator 116 is trained to predict the average RGB value of defined percentages of a highest intensity pixels of a ground truth environment map (e.g. paired ground truth map 126) based on an L1 loss, wherein defined percentages of the highest intensity pixels of the ground truth environment map are calculated based on perceptual lightness channel (L*) of CIELAB color space. In an embodiment, the defined percentages are the top 10% of highest intensity pixels and the top 10-50% of highest intensity pixels. In an embodiment, discriminator-based color loss 118 is determined according to the formula:

$$\text{Loss}_{Discriminator} = L1\big(D_{top10}(\text{map}_{gt}), \text{map}_{gt} * \text{mask}_{top10gt}\big) + $$
$$L1\big(D_{top10-50}(\text{map}_{gt}), \text{map}_{gt} * \text{mask}_{top10-50gt}\big),$$

wherein D is discriminator 116, $\text{map}_{gt}$ is paired ground truth map 126, and $\text{mask}_{gt}$ is a binary mask based on the defined percentage of highest intensity pixels of the paired truth map. In an embodiment, the defined percentage of $\text{mask}_{top10_{gt}}$ is the top 10% of highest intensity pixels. In an embodiment, the defined percentage of $\text{mask}_{top10-50_{gt}}$ is the top 10-50% of highest intensity pixels.

In an embodiment, estimation model 102 is trained on the sum of a reconstruction loss 120 and a light source color loss 114, where in the relative weights of the reconstruction loss to light source color loss is set at 10 to 1. In a further embodiment, discriminator-based color loss 118 is further used to update the training of estimation model 102.

In an embodiment, light source color loss 114 is computed by first passing a predicted environment map (e.g. environment map prediction 112) to discriminator 116 to calculate the average RGB of a defined percentage of highest intensity pixels, where intensity is defined based on perceptual lightness channel (L*) of CIELAB color space. An L1 loss is applied between the output from discriminator 116 and the average RGB of the defined percentage of highest intensity pixels of the ground truth environment map (e.g. paired ground truth map 126) in accordance with the formula:

$$\text{Loss}_{LightSource} = L1\big(D_{top10}(E(x)), \text{map}_{gt} * \text{mask}_{top10gt}\big) + $$
$$L1\big(D_{top10-50}(E(x)), \text{map}_{gt} * \text{mask}_{top10-50gt}\big),$$

wherein D is discriminator 116, E is estimation model 102, x is input image 104, $\text{map}_{gt}$ is paired ground truth map 126, and $\text{mask}_{gt}$ is a binary mask based on the defined percentage of highest intensity pixels of paired ground truth map 126. In an embodiment, the defined percentage of $\text{mask}_{top10_{gt}}$ is the top 10% of highest intensity pixels. In an embodiment, the defined percentage of $\text{mask}_{top10-50_{gt}}$ is the top 10-50% of highest intensity pixels. In an embodiment, color loss module 124 comprises an executable component configured to execute a light source color loss function and provide light source color loss 114 to estimation model 102.

In an embodiment, reconstruction loss 120 comprises an L2 loss applied to minimize a pixel-wise difference between environment map prediction 112 and a ground truth environment map (e.g. paired ground truth map 126) in accordance with the formula:

$$\text{Loss}_{Reconstruction} = L2(E(x), \text{map}_{gt}),$$

wherein E is estimation model 102, x is input image 104, and $\text{map}_{gt}$ comprises a ground truth environment map (e.g. paired ground truth map 126).

In an embodiment, an overall training loss function is applied by estimation model 102 comprising the sum of discriminator-based color loss 118 and weighted sum of reconstruction loss 120 and a light source color loss 114, where in the where the relative weights of the reconstruction loss to light source color loss is set at 10 to 1. In an embodiment, reconstruction loss module 122 comprises an executable component configured to execute a reconstruction loss function and provide reconstruction loss 120 to estimation model 102.

Synthetic Training Data

In an embodiment, estimation model 102 is trained with images (e.g. input image 104) as sampled from a synthetic training dataset created using the DataGen platform. In an embodiment, the synthetic training dataset comprises 50,000 portrait images with combinations of over 5,000 synthetic subjects and 250 environment maps. In accordance with an embodiment, the synthetic subjects and environments are broadly sampled to ensure the synthetic training dataset covers a diversity of demographics and lighting conditions. In an embodiment, the environment maps include both indoor and outdoor scenes, and are at different times in the day, e.g. morning and evening.

To provide a synthetic training dataset representing directional lights from different angles, in accordance with an embodiment, environment maps in the dataset are rotated horizontally at different angles when rendering portrait images. To ensure that an estimation model (e.g. 102) is not biased towards certain demographic groups, synthetic subjects are sampled in the synthetic dataset based on diverse gender, ethnicity and age group. In accordance with a further embodiment, synthetic subjects are generated for the synthetic training dataset with neutral and extreme expressions, and at different head poses and orientation, such as frontal and profile faces. In accordance with an embodiment, the field-of-view of the camera in the synthetic portrait images is fixed to be in between 50 and 70 degrees to resemble the front camera of mobiles and webcams.

In an embodiment, bounding boxes are used to center align heads in portrait images to ensure the estimation model (e.g. 102) focuses on learning the light map from faces during training. In an embodiment, environment maps are rotated and/or shifted so that the centers of the environment maps are aligned with the location of subjects' faces in portrait images. In a further embodiment, random horizontal flip of images and color jittering augmentation of images is employed during training of an estimation model (e.g. 102).

In an embodiment, environment map prediction 112 output from estimation model 102 can be used to locate key direction light sources and estimate ambient light color from input image 104. In an embodiment, estimation model 102 can infer environment panoramas from input image 104 in real time and can be deployed in mobile or web applications.

Evaluation with Synthetic Data

In an embodiment, the performance of an estimation model (e.g. 102) is quantitatively evaluated using synthetic data. An estimation model (e.g. 102) is examined based on residual mean squared error (RMSE), scaled mean residual squared error (sMRSE), RGB angular error and Fréchet inception distance (FID) between environment map prediction (e.g. 112) and a ground truth environment map (e.g. paired ground truth map 126).

In an embodiment, angular error is calculated on predicted equirectangular environment maps (e.g. 112) directly, whereas other metrics are calculated based on a cube map converted from the predicted equirectangular maps.

Estimation Model with Hair Rendering

Figure 2:
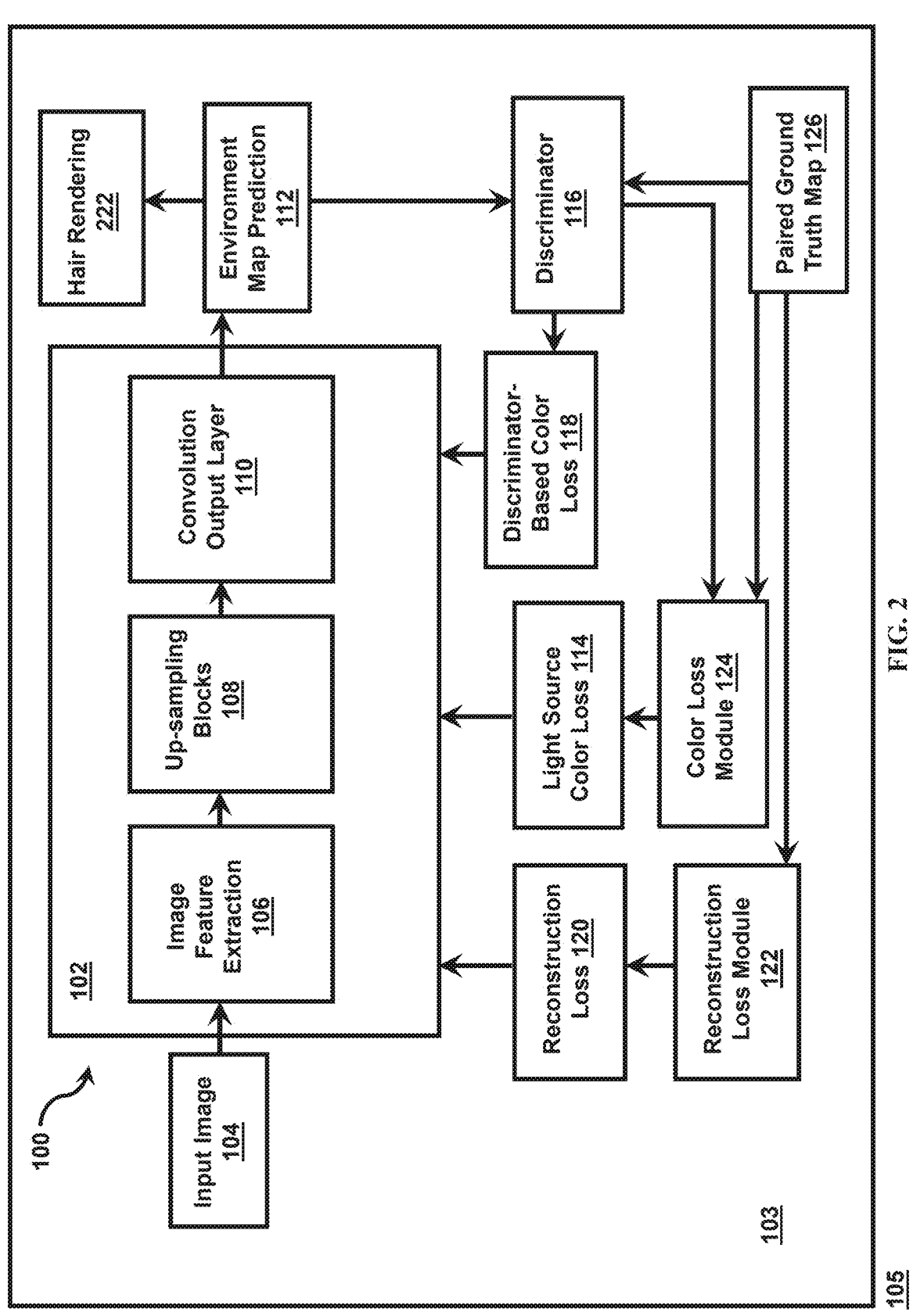
FIG. 2 is a block diagram showing the lighting estimation model of FIG. 1 as adapted with hair rendering, in accordance with an embodiment.

FIG. 2 shows a block diagram of an example computing device configured to provide estimation flow 100 in accordance with an embodiment of FIG. 1. In an embodiment, computing device 105 is further configured to generate a hair rendering 222 adapted to environment map prediction 112. In an embodiment, hair rendering 222 imitates actual hair in portrait images (e.g. input image 104). For example, rendering operations overlay hair pixels to a portrait image (e.g. an input image) to simulate a hair style in a generated output image. In an embodiment, the hair style is defined in accordance with a 3D hair mesh defining a plurality of hair strands etc. for the hair style. In an embodiment, lighting source direction(s) and lighting source color(s) from the environment map is (are) used to adapt a property of the pixels in the output image. Color and/or brightness of hair pixels or other pixels can be adjusted, for example, using shading and lighting techniques to light for e.g. the hair to match the environmental lighting of the input image. Shadows can be determined and rendered. In an embodiment, the environment map is converted to a set of discrete light sources such as by detecting brightest spots in the map and finding the average color for each spot to determine the light color and intensity. Each bright spot is converted to a directional light source. In an embodiment, hair shading is performed using a Marschner hair shading model with the e.g. directional light sources. In an embodiment, indirect lighting is approximated using a dual scattering technique. In an embodiment, look up tables assist with real time performance optimization.

Evaluation with Real Data

As estimation models provided are trained on synthetic data, it is preferable to assess how well the estimation models adapt to real data. Evaluation with real data is typically done either through direct comparison of predicted environment maps (e.g. 112) and actual environment maps, or through rendering objects relighted based on predicted environment maps (e.g. 112) and actual environment maps. Such assessment is challenging due to the absence of ground truth lighting maps and albedo of faces or hair in the portrait images.

To overcome this challenge, an estimation model (e.g. 102) is evaluated through hair renderings (e.g. 222) relighted based on predicted environment maps (e.g. 112) that imitate actual hair in portrait images, and through comparing frame-wise changes in predicted environment maps (e.g. 112) for real videos.

According to an embodiment, to examine the model's ability to predict ambient light color and to locate strong directional lights, light maps are rendered on hair renderings that imitate actual hair in real portrait images. 10 hair experts were asked to annotate the hair color in 1000 portraits images. For each portrait image, the color with the highest agreement amongst the hair expert annotations was used as the ground truth color. Based on the annotated hair color, the average RGB of the corresponding hair swatch images was calculated and hair renderings generated based on the average RGB. In an embodiment, the real portrait images (e.g. 104) are input to an estimation model (e.g. 102) to predict light maps (e.g. environment map prediction 112) and hair meshes (e.g. a simulation of hair from a 3D mesh definition) are rendered (e.g. 222) based on the predicted light maps. Images of the rendered hair meshes are compared with the real portrait images input to the estimation model to evaluate how close the overall hair colors are and whether the specular light locations are consistent.

FIG. 3 shows an array of evaluation images 300 in accordance with an embodiment. Array of images 300 comprises portrait images 302A. 302B (e.g. input images), rendered hair mesh images 304A, 304B based on the predicted environment map (not shown) and annotated hair color and annotated hair color images 306A and 306B. Images 306A and 306B are compiled from average RGB annotated by hair experts. For simplicity, FIG. 3 is shown in greyscale representations of the original RGB color based images. The subject in image 302A originally presents before a predominantly green background of vegetation with dark colored hair (near black). The subject in image 302B presents before a predominantly white and grey background with generally dark sandy colored hair.

In an embodiment, a video-based evaluation method is also employed to examine an estimation model's (e.g. 102) ability to locate key direction lights and consistency in generating an environment map prediction (e.g. 112). Videos with both stable and moving camera positions are used to assess whether the model is able to make reasonable and consistent predictions of strong light sources. According to an embodiment, lighting estimation models are run on each frame of a video input into an estimation model to estimate a frame-wise light map. Subsequently, qualitative evaluations are conducted on how stable a predicted light map is in videos where the background of an input video is stable, and how smooth the key light sources move in videos where the camera recording the input video is moving.

Quantitative analysis indicated an estimation model according to an embodiment was able to locate strong light sources from an input image and to identify whether the ambient light of an input image is cool or warm.

Computing Device Using Estimation Model in VTO Pipeline

Figure 4:
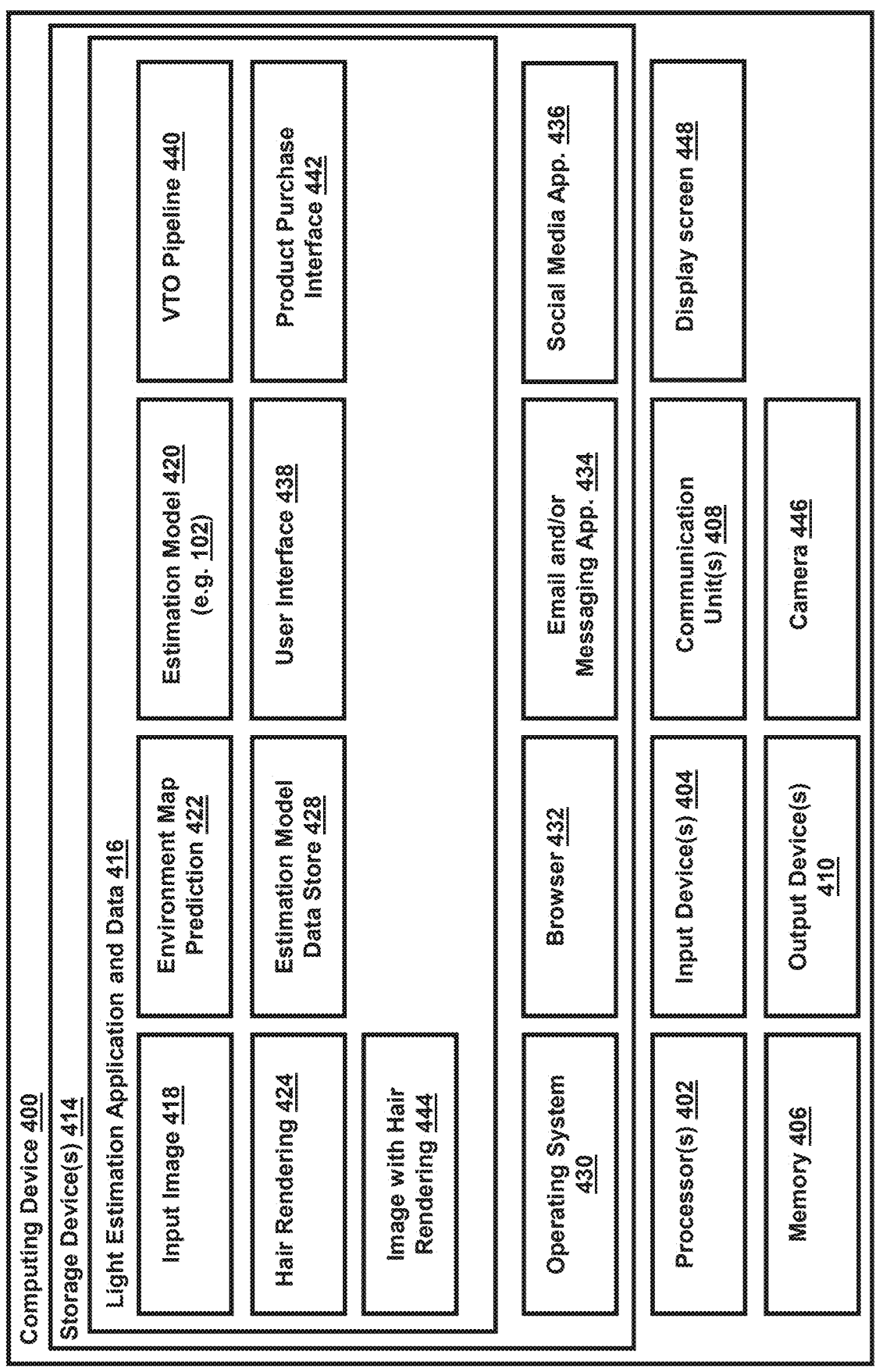
FIG. 4 is a block diagram of a computing device, in accordance with an embodiment.

FIG. 4 is a block diagram of a computing device 400, in accordance with an embodiment. In the embodiment, an estimation model in accordance with an embodiment herein is integrated with a virtual-try on (VTO) application to provide for hair simulation, such as hair simulation from a 3D hair mesh providing a definition of a hair style to simulate. Rendering can be performed as described with reference to FIG. 2. Device 400 is non-limiting and is simplified for brevity.

The computing device 400 comprises one or more processors 402, one or more input devices 404, one or more communication units 408, one or more output devices 410, a display screen 448 (e.g. providing one or more graphical user interfaces), a camera 446, and a memory 406. Computing device 400 also includes one or more storage device(s) 414 storing one or more executable computer modules including lighting estimation application and data 416 comprising: input image 418 (e.g. 104), environment map prediction 422 (e.g. 112), estimation model 420 (e.g. estimation model 102), hair rendering 424 (e.g. hair rendering 222), estimation model data store 428, VTO pipeline 440, user interface 448, product purchase interface 442, and image with hair rendering 444. The computing device 400 may comprise additional computing modules or data stores in various embodiments. Additional computing modules and devices that may be included in various embodiments, are not shown in FIG. 4 to avoid undue complexity of the description, such as communication with one or more other computing devices, as applicable, utilizing communication unit(s) 408, for obtaining input image 418 including via a communication network (not shown).

The one or more storage device(s) 414 stores data and/or computer readable instructions for execution by a processing unit (e.g. processor(s) 402), such that when executed, the instructions cause the computing device to perform operations such as one or more methods. The one or more storage devices 414 may take different forms and/or configurations, for example, as short-term memory or long-term memory. Storage device(s) 414 may be configured for short-term storage of information as volatile memory, which does not retain stored contents when power is removed. Volatile memory examples include random access memory (RAM), dynamic random access memory (DRAM), static random access memory (SRAM), etc. Storage device(s) 414, in some examples, also include one or more computer-readable storage media, for example, to store larger amounts of information than volatile memory and/or to store such information for long term, retaining information when power is removed. Non-volatile memory examples include magnetic hard discs, solid-state hard drives, optical discs, floppy discs, flash memories, or forms of electrically programmable read-only memory (EPROM) or electrically erasable and programmable read-only memory (EEPROM). Computing device 400 may store data/information (e.g. input image 418, environment map prediction 422, or image with hair rendering 444) to storage device(s) 414.

One or more processor(s) 402 may implement functionality and/or execute instructions within the computing device 400. For example, processor(s) 402 may be configured to receive instructions and/or data from storage device(s) 414 to execute the functionality of estimation models (e.g. 102) shown in FIGS. 1 and 2, among other modules (e.g. operating system 430, browser 432, email and/or messaging app. 434, social media app. 436, etc.). Processor(s) 402 comprises one or more central processing units (e.g. CPUs), and/or graphical processing units (e.g. GPUs) having one or more processors/microprocessors, controllers/microcontrollers, etc. Other processor types may be used. GPUs may be particularly useful for accelerating graphics processing tasks and/or deep learning processing tasks (e.g. training and/or inference).

Input device(s) 404 and output device(s) 410 may include any of one or more buttons, switches, pointing devices, a keyboard, a microphone, one or more sensors, a speaker, a bell, one or more lights, etc. One or more of same may be coupled via a wired connection (e.g. Ethernet, USB A, USB C, Thunderbolt (™ of Intel Corporation)), or other communication channel. In an embodiment, camera 446 is a camera capable of capturing and/or recording a limited-field-of-view LDR portrait image. In an embodiment, camera 446 can be used to take selfie images.

One or more communication units 408 may communicate with external computing devices via one or more networks by transmitting and/or receiving network signals on the one or more networks. The communication units 408 may include various antennae and/or network interface cards, etc. for wireless and/or wired communications.

Display screen 448 presents images such as components of a graphical user interface, camera images, etc. In an embodiment the display screen is a touch screen device, a type of I/O device, configured to receive gestural inputs (e.g. swipes, taps, etc.) that interact with region(s) of the screen and in association with user interface components (e.g. controls) presented by an application executed by the processor(s) 402.

The computing device 400 may include additional computing modules or data stores in various embodiments. Additional modules, data stores and devices that may be included in various embodiments may be not be shown in FIG. 4 to avoid undue complexity of the description. Other examples of computing device 400 may be a tablet computer, a person digital assistant (PDA), a laptop computer, a tabletop computer, a portable media player, an e-book reader, a watch, a customer device, a user device, or another type of computing device.

Storage device(s) 414 stores components of a light estimation application and data therefor (e.g. 416). Representative components are shown. Light estimation application and data 416 comprises user interface component 438 (e.g. screens, instructions, icons, controls, etc.). User interface provides output to a user and receive input such as input for application workflow. An estimation model 420 is provided and comprises an estimation model (e.g. 102) as previously described for predicting image lighting conditions (e.g. environment map prediction 422). A VTO pipeline 440 is provided to simulate a hair rendering with environment-sensitive lighting in association with (e.g. on or in) an input image.

In an embodiment, a user can provide an input image (e.g. 418) similar to input image 104, for lighting estimation. In an embodiment, input image (e.g. 418) is captured and/or recorded by a camera (e.g. camera 446). Environment map prediction 422 is generated by estimation model 420 using input image 418 in accordance with an embodiment provided herein. The environment map prediction 422 can be used to generate a hair rendering 424 simulating hair adapted to lighting conditions present in the input image 418. Hair rendering 424 can be displayed on display screen 448. The user may invoke the light estimation application 416 (via an input to a control) to have the application simulate hair responsive to lighting conditions present in an input image 418 using the image 418 and environment map prediction 422 as input to produce an output image with hair rendering 444.

The output image with hair rendering 444 can be presented via the user interface component 438 on display screen 448. Products or services or both can be purchased through interface 442. Such an interface 442 may direct the user (e.g. the computing device) to a web based e-commerce service (e.g. a website (not shown)) to make the purchase, reservation, or the like.

Other components stored in storage device(s) 414 comprise an operating system 430, browser 432 (e.g. for browsing web pages), an email and/or message application 434 (e.g. SMS or other type), and a social media application 436. The output image with hair rendering 444 can be shared (e.g. communicated) via the applications 434 and/or 436, for example.

Figure 5:
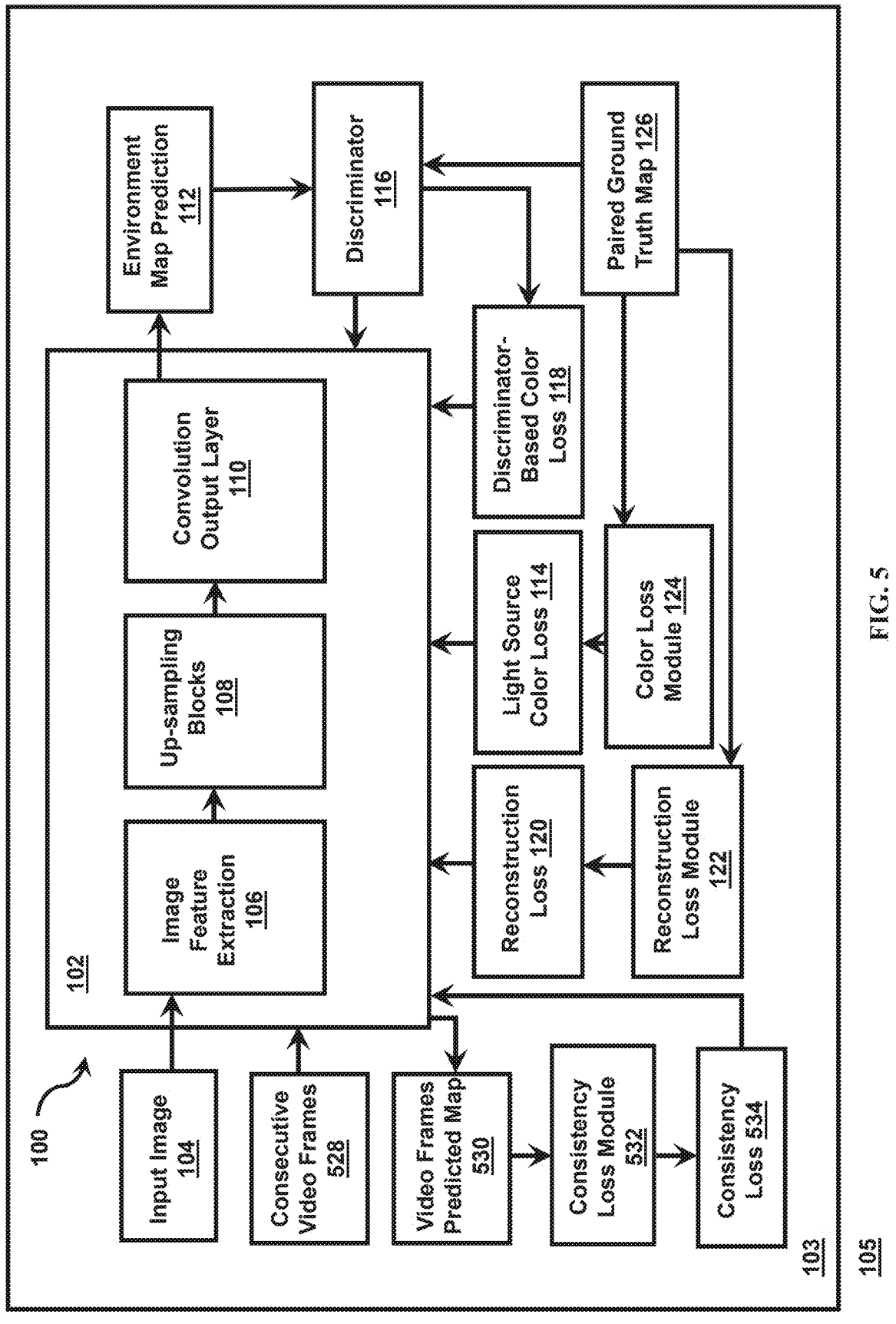
FIG. 5 is a block diagram showing the lighting estimation model of FIG. 1 as adapted with further training refinement using consecutive video frames, in accordance with an embodiment.

FIG. 5 shows a block diagram of an example computing device configured to provide estimation flow 100 in accordance with an embodiment of FIG. 1. In an embodiment, computing device 105 is further configured to train estimation model 102 through refinement associated with video frames. Consecutive video frames 528, comprising two or more consecutive frames of an input video, are provided to estimation model 102. In an example embodiment, three consecutive frames of an input video are provided to estimation model 102. Estimation model 102 is configured to provide video frames predicted map 530, comprising a light environment map prediction for each of two or more consecutive video frames 528, to consistency loss module 532.

In an embodiment, consistency loss 534 is computed by applying a pixel-wise L1 loss between video frames predicted map 530 of one of consecutive video frames 428, and a sum of video frames predicted map 530 for two additional consecutive video frames 528 in accordance with the formula:

$$\text{Loss}_{Consistency} = L1((E(v_{t+1})), 0.5*(E(v_t) + E(v_{t+2}))),$$

wherein E is estimation model 102, $v_t$ is consecutive video frames 528 at time t, $v_{t+1}$ is consecutive video frames 528 at time t+1, and $v_{t+2}$ is consecutive video frames 528 at time t+2.

In an embodiment, computing device 105 is configured to refine training of estimation model 102 utilizing a loss function comprising the sum of reconstruction loss 120, light source color loss 114, discriminator-based color loss 118, and consistency loss 534.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise", "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES

Incorporated herein by reference in their respective entireties are the following documents:

[1] D. Calian, J.-F. Lalonde, P. F. U. Gotardo, T. Simon, I. Matthews, and K. Mitchell, "From Faces to Outdoor Light Probes", Computer Graphics Forum, 37.2, 2018

[2] LeGendre, C., Ma, W. C., Pandey, R., Fanello, S., Rhemann, C., Dourgarian, J., Busch, J. and Debevec, P., 2020. Learning illumination from diverse portraits. In SIGGRAPH Asia 2020 Technical Communications (pp. 1-4).

[3] Sztrajman, A., Neophytou, A., Weyrich, T. and Sommerlade, E., 2020 November. High-Dynamic-Range Lighting Estimation From Face Portraits. In 2020 International Conference on 3D Vision (3DV) (pp. 355-363). IEEE.

[4] Stratou, G., Ghosh, A., Debevec, P. and Morency, L. P., 2011 March. Effect of illumination on automatic expression recognition: a novel 3D relightable facial database. In 2011 IEEE International Conference on Automatic Face & Gesture Recognition (FG) (pp. 611-618). IEEE.

[5] LeGendre, C., Ma, W. C., Fyffe, G., Flynn, J., Charbonnel, L., Busch, J. and Debevec, P., 2019. Deeplight: Learning illumination for unconstrained mobile mixed reality. In Proceedings of the IEEE/CVF Conference on Computer Vision and Pattern Recognition (pp. 5918-5928).

[6] Somanath, G. and Kurz, D., 2021. HDR environment map estimation for real-time augmented reality. In Proceedings of the IEEE/CVF Conference on Computer Vision and Pattern Recognition (pp. 11298-11306).

[7] Wang, G., Yang, Y., Loy, C. C. and Liu, Z., 2022 October. Stylelight: Hdr panorama generation for lighting estimation and editing. In European Conference on Computer Vision (pp. 477-492). Cham: Springer Nature Switzerland.

[8] Gardner, M. A., Hold-Geoffroy, Y., Sunkavalli, K., Gagné, C. and Lalonde, J. F., 2019. Deep parametric indoor lighting estimation. In Proceedings of the IEEE/CVF International Conference on Computer Vision (pp. 7175-7183).

[9] Gardner, M. A., Sunkavalli, K., Yumer, E., Shen, X., Gambaretto, E., Gagné, C. and Lalonde, J. F., 2017. Learning to predict indoor illumination from a single image. arXiv preprint arXiv: 1704.00090.

[10] Garon, M., Sunkavalli, K., Hadap, S., Carr, N. and Lalonde, J. F., 2019. Fast spatially-varying indoor lighting estimation. In Proceedings of the IEEE/CVF Conference on Computer Vision and Pattern Recognition (pp. 6908-6917).

What is claimed is:

1. A computing device comprising a processor coupled to a storage device storing instructions executable by the processor to cause the computing device to:

predict a predicted environment map for lighting conditions in an input image using a generator of a deep learning model, the predicted environment map encoding one or more light sources and an estimate of light source color in the input image, the deep learning model having been defined through training using a discriminator that predicts one or more average color values of a defined percentage of highest intensity pixels of an environment map, the discriminator defined using a color loss determined from:

one or more average color values of a defined percentage of highest intensity pixels of a ground truth environment map; and a prediction by the discriminator for a training time predicted environment map generated by the generator; and generate an output image comprising one or more objects from the input image to which one or more respective effects are applied, wherein a property of each of the respective effects is adapted to the predicted environment map.

2. The computing device of claim 1, wherein the training time predicted environment map encodes one or more predicted light sources and an estimate of light source color of one of a plurality of synthetically generated images provided to the generator, the plurality of synthetically generated images having lighting conditions comprising light source direction and light source color.

3. The computing device of claim 2, wherein at least one of:

the plurality of synthetically generated images comprises a dataset of portrait images containing combinations of subjects and environments sampled to cover a diversity of demographics, light source directions, and light source colors;

the plurality of synthetically generated images subjects comprise synthetic faces sampled based on diverse gender, ethnicity, and age;

the plurality of synthetically generated images are generated to include instances of neutral facial expressions and extreme facial expressions and at different head poses and orientations; or the plurality of synthetically generated images comprises images with a field-of-view set between 50 and 70 degrees view angle.

4. The computing device of claim 1, wherein the deep learning model is defined through training comprising generating one or more bounding boxes to align a center of a head in the input image and perform one or both of rotating or transposing an environment of the input image to align a center of the environment with the center of the head.

5. The computing device of claim 1, wherein the defined percentage of the highest intensity pixels of the ground truth environment map is within the range of 5 percent to 10 percent.

6. The computing device of claim 5, wherein the intensity of pixels of the ground truth environment map is defined based on a perceptual lightness channel (L*) of CIELAB color space.

7. The computing device of claim 1, wherein the generator comprises one or more convolution output layers, and one or more upsampling blocks, each of the upsampling blocks comprising a convolution layer, a ReLu activation layer, and a bilinear upsampling layer.

8. The computing device of claim 1, wherein the input image comprises a limited field-of-view low-dynamic-range portrait image and the output image comprises a high-dynamic-range image.

9. The computing device of claim 1, wherein the effect applied to the one or more objects from the input image is a virtual-try on effect.

10. The computing device of claim 1, wherein the generator is defined through training using a reconstruction loss, the reconstruction loss defined from an L2 loss applied to the training time predicted environment map and the ground truth environment map.

11. The computing device of claim 10, wherein the generator is defined through training using a generator loss, the generator loss determined from a weighted sum of the reconstruction loss and the color loss, and wherein the weighted sum is set to 10 to 1.

12. The computing device of claim 1, wherein the generator is defined through training using a consistency loss, the consistency loss determined from:

a first predicted environment map generated by the generator for lighting conditions of a first consecutive video frame; and the sum of a second predicted environment map generated by the generator for lighting conditions of a second consecutive video frame and a third predicted environment map generated by the generator for lighting conditions of a third consecutive video frame.

13. The computing device of claim 1, further comprising a camera device configured to perform one or both of capturing or recording the input image.

14. A method of configuring a deep learning model that predicts lighting conditions in an input image and generates a predicted environment map for lighting conditions in the input image, the method comprising:

defining the deep learning model through training using a discriminator that predicts one or more average color values of a defined percentage of highest intensity pixels of an environment map, the discriminator defined using a color loss determined from:

one or more average color values of a defined percentage of highest intensity pixels of a ground truth environment map; and a prediction by the discriminator for a training time predicted environment map generated by a generator of the deep learning model for lighting condition of a training image; and generating the predicted environment map using the generator, the generator having been defined through training using the color loss.

15. The method of claim 14, wherein the training image comprises one of a plurality of synthetically generated images provided to the generator, the plurality of synthetically generated images having lighting conditions comprising light source direction and light source color.

16. The method of claim 15, wherein at least one of:

the plurality of synthetically generated images comprises a dataset of portrait images containing combinations of subjects and environments sampled to cover a diversity of demographics, light source directions, and light source colors;

the plurality of synthetically generated images subjects comprise synthetic faces sampled based on diverse gender, ethnicity, and age;

the plurality of synthetically generated images are generated to include instances of neutral facial expressions and extreme facial expressions and at different head poses and orientations; or the plurality of synthetically generated images comprises images with a field-of-view set between 50 and 70 degrees view angle.

17. The method of claim 14, wherein the generator is defined through training using a reconstruction loss, the reconstruction loss defined from an L2 loss applied to the training time predicted environment map and the ground truth environment map.

18. The method of claim 17, wherein the generator is defined through training using a generator loss, the generator loss determined from a weighted sum of the reconstruction loss and the color loss, and wherein the weighted sum is set to 10 to 1.

19. The method of claim 14, wherein the generator is defined through training using a consistency loss, the consistency loss determined from:

a first predicted environment map generated by the generator for lighting conditions of a first consecutive video frame; and the sum of a second predicted environment map generated by the generator for lighting conditions of a second consecutive video frame and a third predicted environment map generated by the generator for lighting conditions of a third consecutive video frame.

20. A computing device comprising:

a VTO (virtual try-on) rendering engine configured to produce an output image for display, wherein the output image comprises an object from an input image to which a VTO effect is applied, the VTO rendering engine comprising a deep learning model configured through training to provide a predicted environment map for lighting conditions in the input image and wherein the effect is applied to the object as adapted by the predicted environment map, the deep learning model defined through training by:

providing a generator;

providing a discriminator that predicts one or more average color values of a defined percentage of highest intensity pixels of an environment map, the discriminator defined using a color loss determined from:

one or more average color values of a defined percentage of highest intensity pixels of a ground truth environment map; and a prediction by the discriminator for a training time predicted environment map generated by the generator; and wherein the training time predicted environment map encodes one or more predicted light sources and an estimate of light source color of one or more of a plurality of synthetically generated images provided to the generator, the plurality of synthetically generated images having lighting conditions comprising light source direction and light source color; and wherein the generator is defined through training using a reconstruction loss, the reconstruction loss defined from an L2 loss applied to the training time predicted environment map and the ground truth environment map; and one or both of a VTO product recommendation interface or a product purchase interface, wherein the VTO effect is associated with a product to simulate a trying on.

* * * * *